(12) United States Patent
Hu et al.

(10) Patent No.: US 8,577,209 B2
(45) Date of Patent: Nov. 5, 2013

(54) METHOD FOR UTILIZING AT LEAST ONE STORAGE SPACE SHARING SCHEME TO MANAGE STORAGE SPACES UTILIZED BY VIDEO PLAYBACK OPERATION AND RELATED VIDEO PLAYBACK APPARATUS THEREOF

(75) Inventors: Chun-Kuang Hu, Hsinchu (TW); Shih-Rong Kao, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 357 days.

(21) Appl. No.: 12/815,416

(22) Filed: Jun. 15, 2010

(65) Prior Publication Data

US 2011/0305442 A1 Dec. 15, 2011

(51) Int. Cl.
*H04N 5/93* (2006.01)
(52) U.S. Cl.
USPC .......................................... 386/353; 386/354
(58) Field of Classification Search
None
See application file for complete search history.

(56) References Cited

U.S. PATENT DOCUMENTS

| | | | |
|---|---|---|---|
| 2009/0297130 A1* | 12/2009 | Otsuka et al. | 386/124 |
| 2010/0122310 A1* | 5/2010 | Chozui | 725/139 |
| 2010/0189418 A1* | 7/2010 | Mizutani | 386/95 |
| 2011/0001880 A1* | 1/2011 | Chen et al. | 348/631 |
| 2011/0069152 A1* | 3/2011 | Wang et al. | 348/43 |
| 2011/0268425 A1* | 11/2011 | Glen | 386/272 |

FOREIGN PATENT DOCUMENTS

| CN | 1913028 A | 2/2007 |
|---|---|---|
| CN | 101540849 A | 9/2009 |
| WO | 2009132140 A1 | 10/2009 |

\* cited by examiner

*Primary Examiner* — Huy T Nguyen
*Assistant Examiner* — Eileen Adams
(74) *Attorney, Agent, or Firm* — Winston Hsu; Scott Margo

(57) ABSTRACT

An exemplary method for managing a first storage space and a second storage space utilized by a video playback operation includes: during a first time period, accessing the first storage space for data associated with a first processing operation included in the video playback operation, and accessing the second storage space for data associated with a second processing operation included in the video playback operation; and during a second time period, accessing the first storage space and the second storage space for data associated with the first processing operation. The first processing operation is different from the second processing operation. The second storage space is dedicated to buffering data associated with the second processing operation during the first time period.

28 Claims, 11 Drawing Sheets

METHOD FOR UTILIZING AT LEAST ONE STORAGE SPACE SHARING SCHEME TO MANAGE STORAGE SPACES UTILIZED BY VIDEO PLAYBACK OPERATION AND RELATED VIDEO PLAYBACK APPARATUS THEREOF

BACKGROUND

The disclosed embodiments of the present invention relate to processing data for video playback, and more particularly, to a method for utilizing one or more storage space sharing schemes to manage storage spaces utilized by a video playback operation and related video playback apparatus thereof.

In regard to video playback, data buffers are generally required to store processed data and/or unprocessed data. Taking the playback of video contents provided by a Blu-ray disc (BD) for example, the data read from the BD may include a primary video stream, secondary video stream, and background image data such as joint photographic experts group (JPEG) files. If one dedicated frame buffer is particularly allocated to buffer a decoding result of the primary video stream, another dedicated frame buffer is particularly allocated to buffer a decoding result of the secondary video stream, and one dedicated image buffer is particularly allocated to buffer a decoding result of the background image data, a huge storage space within a storage device (e.g., a memory) is occupied due to these buffers. In addition, these buffers should be properly managed to avoid the undesired memory fragment and bandwidth problem.

Therefore, there is a need for an innovative buffer management scheme which can effectively reduce the buffer requirement without degrading the display quality.

SUMMARY

In accordance with exemplary embodiments of the present invention, a method for utilizing one or more storage space sharing schemes to manage storage spaces utilized by a video playback operation and related video playback apparatus thereof are proposed to solve the above-mentioned problem.

According to a first aspect of the present invention, an exemplary method for managing a first storage space and a second storage space utilized by a video playback operation is disclosed. The exemplary method includes the following steps: during a first time period, accessing the first storage space for data associated with a first processing operation included in the video playback operation, and accessing the second storage space for data associated with a second processing operation included in the video playback operation, where the first processing operation is different from the second processing operation, and the second storage space is dedicated to buffering data associated with the second processing operation during the first time period; and during a second time period different from the first time period, accessing the first storage space and the second storage space for data associated with the first processing operation.

According to a second aspect of the present invention, an exemplary video playback apparatus is disclosed. The exemplary video playback apparatus includes a storage device and a video playback processing device. The storage device has a first storage space and a second storage space allocated therein. During a first time period, the video playback processing device accesses the first storage space for data associated with a first processing operation performed by the video playback processing device, and accesses the second storage space for data associated with a second processing operation performed by the video playback processing device, where the first processing operation is different from the second processing operation, and the second storage space is dedicated to buffering data associated with the second processing operation during the first time period. During a second time period different from the first time period, the video playback processing device accesses the first storage space and the second storage space for data associated with the first processing operation performed by the video playback processing device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
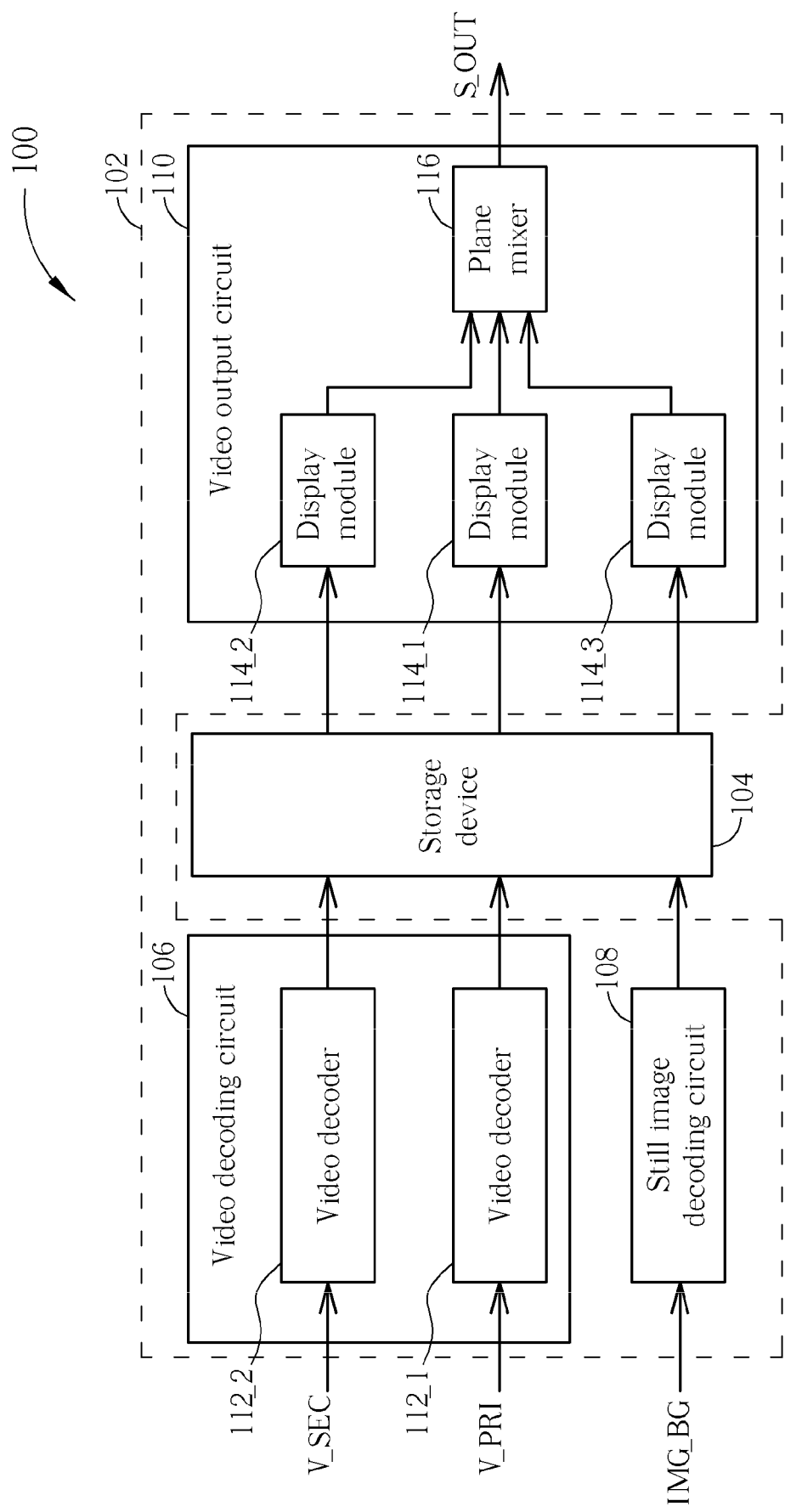
FIG. 1 is a block diagram illustrating a video playback apparatus according to an exemplary embodiment of the present invention.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Picture-in-picture (PiP) is a feature for displaying a secondary video and a primary video at the same time, where the secondary video overlays a partial area of the primary video. In accordance with the Blu-ray disc (BD) specification, no PiP function is supported when the primary video is scaled or a particular hardware configuration is set. Therefore, the secondary video related buffer is available for other purposes under such a scenario. In addition, when the PiP function is enabled, a background image is invisible and no background image change is permitted according to the BD specification. Thus, part of the background image related buffer may be used for other purposes under such a scenario. Based on at least these observations, the storage space sharing becomes feasible.

The conception of the present invention is to employ at least one storage space sharing scheme to thereby effectively reduce the total buffer size of the implemented buffers. More specifically, a specific storage space allocated in a storage device (e.g., a memory device) may be shared between different processing operations included in a video playback operation. For example, during a first time period, a video playback processing device accesses a first storage space for data associated with a first processing operation performed by the video playback processing device, and accesses a second storage space for data associated with a second processing operation performed by the video playback processing device, wherein the first processing operation is different from the second processing operation. However, during a second time period different from the first time period, the video playback processing device accesses the first storage space and the second storage space for data associated with the first processing operation performed by the video playback processing device, wherein the second storage space is dedicated to buffering data associated with the second processing operation during the first time period. In one exemplary storage space sharing scheme, the first processing operation may be a video output operation, and the second processing operation may be a video decoding operation. In another exemplary storage space sharing scheme, the first processing operation may be a non-scaled video output operation, and the second processing operation may be a scaled video output operation. In yet another exemplary storage space sharing scheme, the first processing operation may be a still image decoding operation, and the second processing operation may be a video decoding operation. Further details are described as follows.

Please refer to FIG. 1, which is a block diagram illustrating a video playback apparatus 100 according to an exemplary embodiment of the present invention. The exemplary video playback apparatus 100 includes a video playback processing device 102 and a storage device 104. The video playback processing device 102 includes a video decoding circuit 106, a still image decoding circuit 108, and a video output circuit 110, wherein the video decoding circuit 106 includes a plurality of video decoders 112_1 and 112_2. The video output circuit 110 includes a plurality of display modules 114_1-114_3 and a plane mixer 116. By way of example, but not limitation, the video playback apparatus 100 may be implemented in a BD player used to perform a video playback operation upon video contents recorded on a Blu-ray disc according to the BD specification. Therefore, a primary video stream V_PRI and a secondary video stream V_SEC complying with the BD specification are fed into the video decoding circuit 106, and a background image data IMG_BG complying with the BD specification is fed into the still image decoding circuit 108. For example, the background image data IMG_BG is encoded/compressed using a joint photographic experts group (JPEG) standard, and the still image decoding circuit 108 may be realized by a JPEG decoder. However, this is for illustrative purposes only, and is not meant to be taken as a limitation of the present invention.

In this exemplary embodiment, one video decoder 112_1 in the video decoding circuit 106 is dedicated to decoding the incoming primary video stream V_PRI, and another video decoder 112_2 in the video decoding circuit 106 is dedicated to decoding the incoming secondary video stream V_SEC. However, in an alternative design, the video decoding circuit 106 may be modified to have one decoder included therein for decoding both of the primary video stream V_PRI and the secondary video stream V_SEC.

The storage device 104 may be implemented using one or more storage elements to have a plurality of storage spaces allocated therein for buffering the decoded results generated from the preceding video decoding circuit 106 and the still image decoding circuit 108. For example, the storage device 104 is a memory device (e.g., a dynamic random access memory) with frame buffer(s) allocated therein for the video decoder(s) included in the video decoding circuit 106 and a background image buffer allocated therein for the still image decoding circuit (e.g., a JPEG decoder) 108.

The video output circuit 110 is arranged to read the decoded video/image data buffered in the storage device 104 and generate a video output S_OUT to a display device such as a television. For example, in a case where the decoded video data includes fields, the video output circuit 110 may perform de-interlacing upon the fields and accordingly generate frames to be displayed. As shown in FIG. 1, the display module 114_1 is arranged to read decoded video data derived from the primary video stream V_PRI and generate a primary video output to the plane mixer 116, the display module 114_2 is arranged to read decoded video data derived from the secondary video stream V_SEC and generate a secondary video output to the plane mixer 116, and the display module 114_3 is arranged to read decoded images derived from the background image data IMG_BG and generate a background image output to the plane mixer 116. As mentioned above, the display modules 114_1 and 114_2 may have the de-interlacing capability for generating the primary video output and secondary video output according to fields generated from the video decoding circuit 106. The plane mixer 116 is use to properly mix the primary video output, the secondary video output and/or the background image video output and accordingly generate the video output S_OUT which carries the desired video contents to be displayed on the display device. As the present invention focuses on the management of storage spaces allocated in the storage device 104, further description directed to the operations and functions of the video decoding circuit 106, the still image decoding circuit 108, and the video output circuit 110 is omitted here for the sake of brevity.

Figure 2:
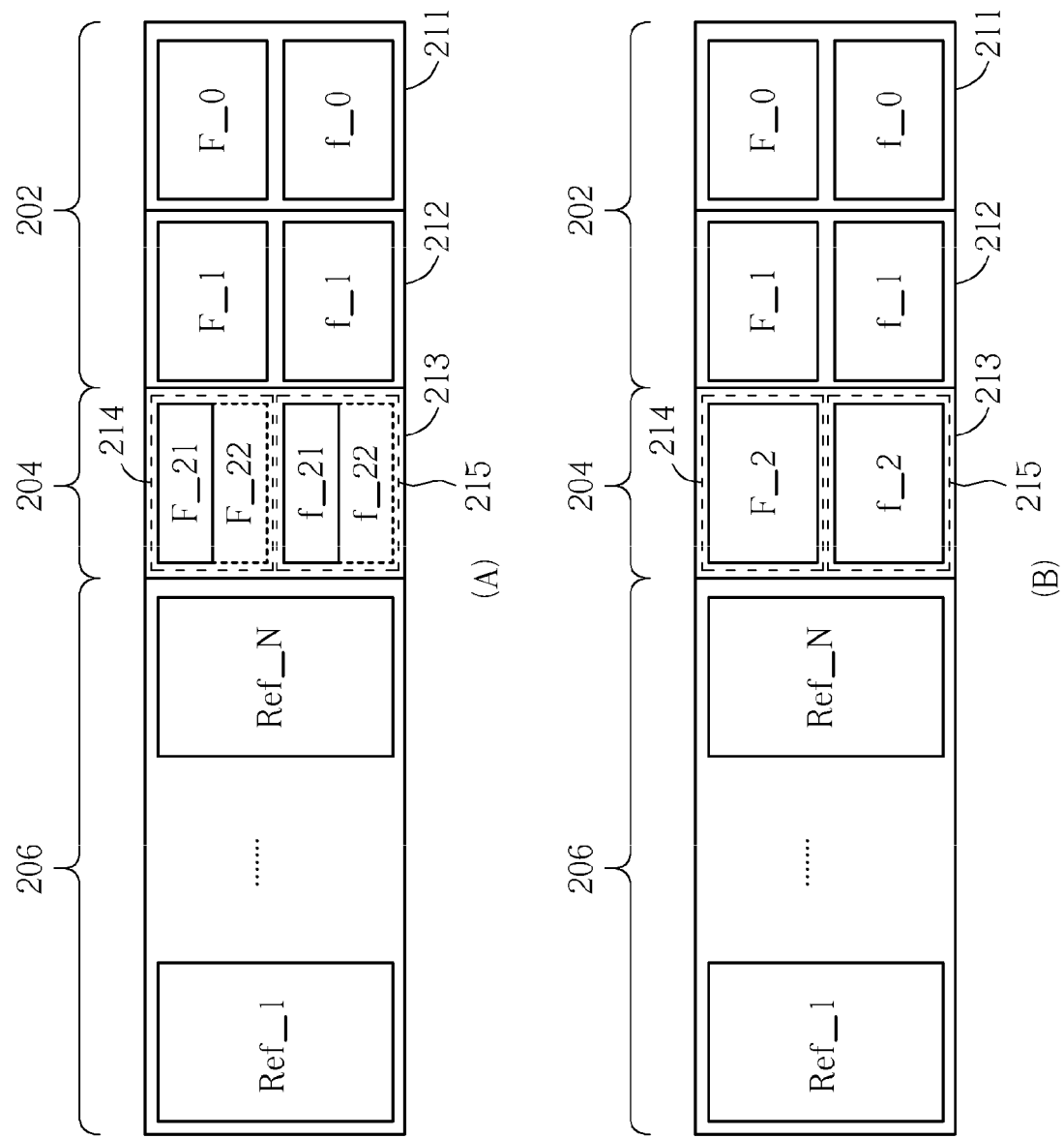
FIG. 2 is a diagram illustrating a first exemplary storage space sharing scheme which may be employed by the video playback apparatus shown in FIG. 1.

Please refer to FIG. 2, which is a diagram illustrating a first exemplary storage space sharing scheme which may be employed by the video playback apparatus 100. In this exemplary embodiment, the storage device 104 shown in FIG. 1 has a plurality of allocated storage spaces, including a first storage space 202, a second storage space 204, and a third storage space 206. Consider a situation where each of the display modules 114_1 and 114_2 employs a 4-field de-interlacing scheme to generate one frame by referring to four fields, and each of the video decoders 112_1 and 112_2 generates one decoded predictive picture (P-picture) or bi-predictive picture (B-picture) by referring to a plurality of reference pictures. Regarding the decoding of a P-picture/B-picture for the primary video which has a high-definition (HD) resolution, a maximum number of the reference pictures is four according to the BD specification. Regarding the decoding of a P-picture/B-picture for the secondary video which has a standard-definition (SD) resolution, a maximum number of the reference pictures is five according to the BD specification. As can be seen from FIG. 2, the first storage device 202 includes two display buffers 211 and 212 each for buffering two pictures, such as one top field F_0/F_1 and one bottom field f_0/f_1 to be read and processed by the display module 114_1/114_2; the second storage space 204 includes one decoding buffer 213 for buffering decoded data currently generated from the video decoder 112_1/112_2; and the third storage space 206 is used to buffer a plurality of reference pictures Ref_1-Ref_N referred to by the video decoder 112_1/112_2 for generating the decoded data to the decoding buffer 213.

Please note that the second storage space 204 includes a first buffer area 214 and a second buffer area 215. When the video playback apparatus 100 is operated under a first phase of a display mode, the second storage space 204 is dedicated to buffering decoded data generated from the video decoder 112_1/112_2, and the first storage space 202 is dedicated to storing data to be read and processed by the display module 114_1/114_2, as shown in the sub-diagram (A) of FIG. 2. Thus, the video decoder 112_1/112_2 of the video decoding circuit 106 generates a portion of a first picture (e.g., a portion F_21 of a top field F_2) and a portion of a second picture (e.g., a portion f_21 of a bottom field f_2) to the second buffer area 214 and the second buffer area 215, respectively, and the display module 114_1/114_2 of the video output circuit 110 reads data from the first storage space 202 for further processing. For example, the display module 114_1/114_2 may perform a 4-field de-interlacing operation upon four fields such as top fields F_0 and F_1 and bottom fields f_0 and f_1, wherein the top field F_0, the bottom field f_0, the top field F_1, and the bottom field f_1 are temporally successive fields.

When the video playback apparatus 100 is operated under a second phase of the display mode, the video decoder 112_1/112_2 of the video decoding circuit 106 respectively generates a remaining portion of the first picture (e.g., a remaining portion F_22 of the top field F_2) and a remaining portion of the second picture (e.g., a remaining portion f_22 of the bottom field f_2) to the first buffer area 214 and the second buffer area 215, as shown in the sub-diagram (B) of FIG. 2. In addition, the display module 114_1/114_2 of the video output circuit 110 reads data from the first storage space 202 and also sequentially reads the portion and the remaining portion of the first picture (e.g., F_21 and F_22) from the first buffer area 214. That is, the display module 114_1/114_2 performs a 4-field de-interlacing operation upon four fields such as top fields F_2 and F_1 and bottom fields f_1 and f_0, wherein the bottom field f_0, the top field F_1, the bottom field f_1, and the top field F_2 are temporally successive fields. It should be noted that the video decoder 112_1/112_2 sequentially stores data of the remaining portion of the first picture (e.g., the remaining portion F_22 of the top field F_2) into the first buffer area 214 while the display module 114_1/114_2 is sequentially reading data of the portion of the first picture (e.g., the portion F_21 of the top field F_2) from the first buffer area 214; however, the video decoder 112_1/112_2 finishes storing the remaining portion of the first picture (e.g., the remaining portion F_22 of the top field F_2) into the first buffer area 214 before the display module 114_1/114_2 finishes reading the portion and the remaining portion of the first picture (e.g., F_21 and F_22) from the first buffer area 214. Thus, the second storage space 204 can be successfully shared between a first processing operation (e.g., a video output operation) and a second processing operation (e.g., a video decoding operation) performed by the video playback apparatus 100.

The first exemplary storage space sharing scheme can be briefly summarized as follows. During a first time period in which the video playback apparatus 100 is operated under a first phase of a display mode, the display module 114_1/114_2 of the video output circuit 110 accesses the first storage space 202 for data associated with a first processing operation (e.g., a video output operation), and the video decoder 112_1/112_2 of the video decoding circuit 106 accesses the second storage space 204 for data associated with a second processing operation (e.g., a video decoding operation). In addition, during a second time period in which the video playback apparatus 100 is operated under a second phase of the display mode, the display module 114_1/114_2 of the video output circuit 110 accesses the first storage space 202 and the second storage space 204 for data associated with the first processing operation, wherein the second storage space 204 is dedicated to buffering data associated with the second processing operation during the first time period.

Figure 3:
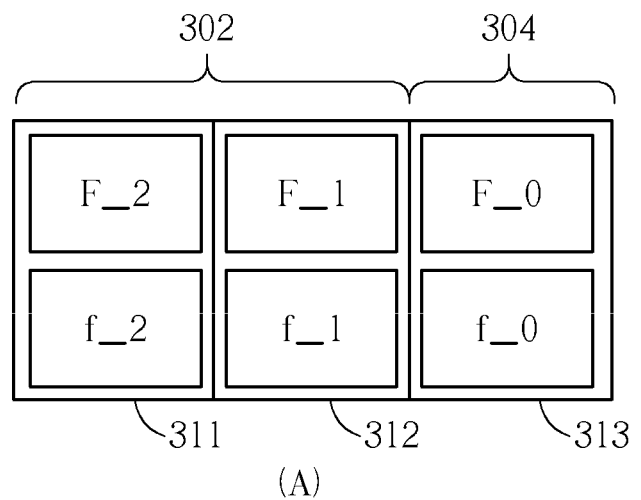
FIG. 3 is a diagram illustrating a second exemplary storage space sharing scheme which may be employed by the video playback apparatus shown in FIG. 1.
Figure 3:
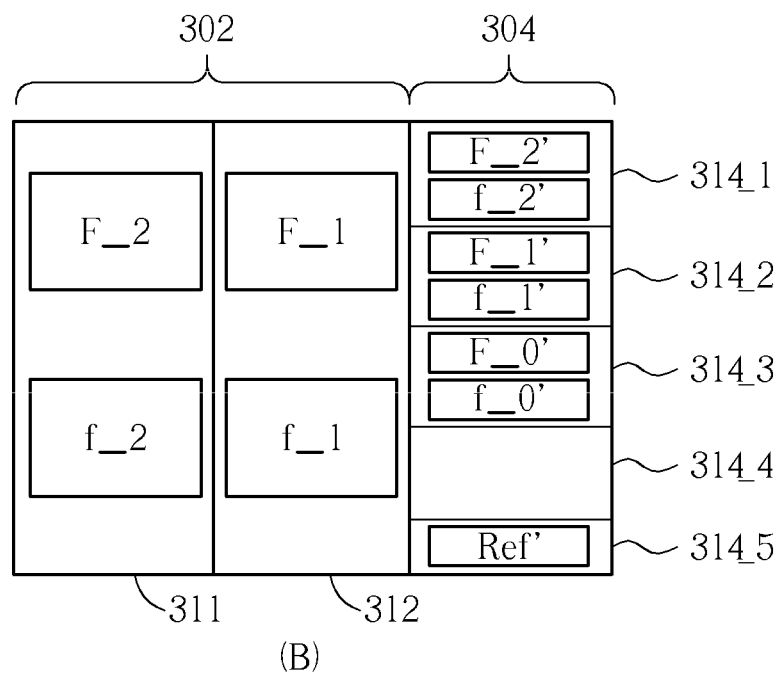

Please refer to FIG. 3, which is a diagram illustrating a second exemplary storage space sharing scheme which may be employed by the video playback apparatus 100. In this exemplary embodiment, the storage device 104 shown in FIG. 1 has a plurality of allocated storage spaces, including a first storage space 302 and a second storage space 304. Consider a situation where each of the display modules 114_1 and 114_2 employs a 4-field de-interlacing scheme to process four non-scaled fields and accordingly generate at least one non-scaled frame when a non-scaled video output of the primary/secondary video is requested; in addition, each of the video decoders 112_1 and 112_2 generates scaled fields and each of the display modules 114_1 and 114_2 performs the 4-field de-interlacing operation upon four scaled fields to generate at least one scaled frame when a scaled video output of the primary/secondary video is requested. For example, when a downscaled video output of the primary/secondary video is requested, each of the video decoders 112_1 and 112_2 generates downscaled fields and each of the display modules 114_1 and 114_2 performs de-interlacing upon the downscaled fields to generate downscaled frames to be displayed. It should be noted that in accordance with the BD specification, the non-scaled video output of the primary/secondary video is disabled when the scaled video output of the primary/secondary video is enabled. To put it another way, the display buffers originally used for buffering the non-scaled fields are not used for actual video playback when the scaled video playback is enabled. Thus, the display buffers may be used for buffering scaled fields required by the scaled video playback. However, it is possible that a zoom change function is activated by the user to show the non-scaled video contents during the scaled video playback. In one exemplary design of the present invention, only part of the display buffers is used for buffering the scaled fields after the scaled video playback is enabled, and the remaining display buffers are used for buffering non-scaled fields in case a zoom change function is activated during the scaled video playback. In this way, the display quality is not degraded even though the storage space sharing scheme is employed.

When the video playback apparatus 100 is operated under one display mode, the first storage space 302 is configured to have two display buffers 311 and 312 allocated therein, and the second storage space 304 is configured to have a display buffer 313 allocated therein, wherein each of the display buffers 311-313 is used for buffering two non-scaled pictures, such as one top field F_0/F_1/F_2 and one bottom field f_0/f_1/f_2 shown in the sub-diagram (A) of FIG. 3. The display module 114_1/114_2 of the video output circuit 110 may perform a 4-field de-interlacing operation according to four temporally successive fields stored in the first storage space 302 and the second storage space 304. For example, the top field F_0, the bottom field f_0, the top field F_1, and the bottom field f_1 are read from the display buffers 312 and 313 by the display module 114_1/114_2, or the bottom field f_0, the top field F_1, the bottom field f_1, and the top field F_2 are read from the display buffers 311-313 by the display module 114_1/114_2.

When the video playback apparatus 100 is operated under another display mode, the first storage space 302 is configured to have two display buffers 311 and 312 allocated therein, but the second storage space 304 is configured to have a plurality of scale buffers allocated therein, as shown in the sub-diagram (B) of FIG. 3. In accordance with the BD specification, five downscale buffers may be required by the scaled video output of the primary/secondary video. As can be seen from the figure, the second storage space 304 may be configured to have five scale buffers (e.g., downscale buffers) 314_1-314_5 dedicated to buffering data of scaled pictures (e.g., scaled fields) required by the scaled video playback, wherein the scale buffers 314_1-314_3 may act as display buffers used for buffering scaled fields (e.g., scaled top fields F_0', F_1', and F_2' and scaled bottom fields f_0', f_1', and f_2') to be read and processed by the display module 114_1/114_2 which employs a 4-field de-interlacing scheme, the scale buffer 314_5 may act as a decoding buffer for buffering any decoded data currently generated from the video decoder 112_1/112_2, and the scale buffer 314_4 may act as a buffer for buffering a decoded but not yet displayed picture or buffering a scaled picture. Thus, the second storage space 304 can be successfully shared between a first processing operation (e.g., a non-scaled video decoding operation) and a second processing operation (e.g., a scaled video decoding operation) performed by the video playback apparatus 100.

The second exemplary storage space sharing scheme can be briefly summarized as follows. During a first time period in which the video playback apparatus 100 is operated under a first display mode, the video decoder 112_1/112_2 of the video decoding circuit 106 accesses the first storage space 302 for data associated with a first processing operation (e.g., a non-scaled video output operation) and accesses the second storage space 304 for data associated with a second processing operation (e.g., a scaled video decoding operation). In addition, during a second time period in which the video playback apparatus 100 is operated under a second display mode different from the first display mode, the video decoder 112_1/112_2 of the video decoding circuit 106 accesses the first storage space 302 and the second storage space 304 for data associated with the first processing operation, wherein the second storage space 304 is dedicated to buffering data associated with the second processing operation during the first time period in which the video playback apparatus 100 is operated under the first display mode.

Figure 4:
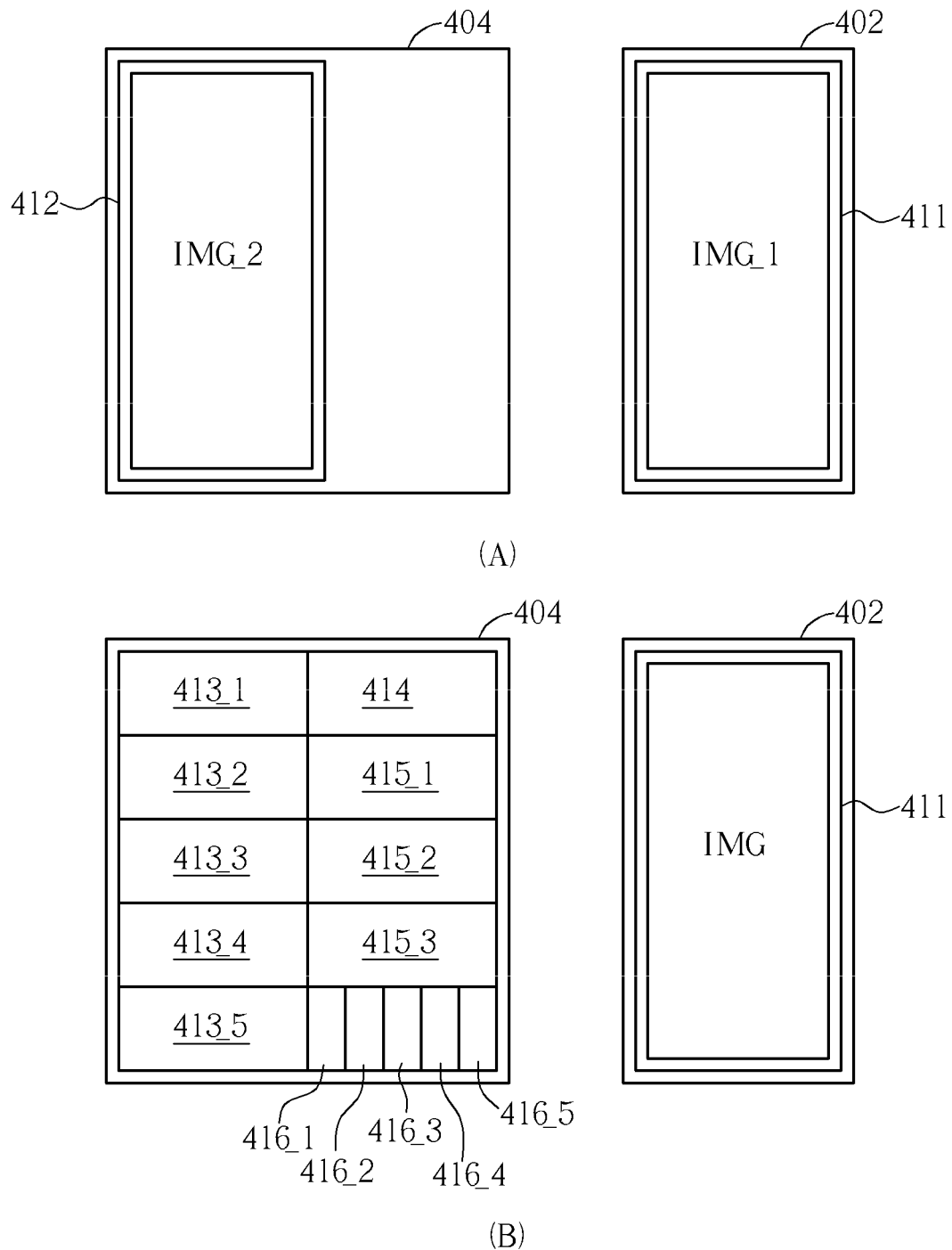
FIG. 4 is a diagram illustrating a third exemplary storage space sharing scheme which may be employed by the video playback apparatus shown in FIG. 1.

Please refer to FIG. 4, which is a diagram illustrating a third exemplary storage space sharing scheme which may be employed by the video playback apparatus 100. In this exemplary embodiment, the storage device 104 shown in FIG. 1 has a plurality of allocated storage spaces, including a first storage space 402 and a second storage space 404. In general, two background image buffers, respectively used to buffer two background images, are employed to avoid the undesired tearing effect. That is, one of the background image buffers acts as a working buffer for a background image which is currently generated from decoding the background image data, whereas the other the background image buffers stores a background image which has been derived from decoding the background image data. However, as mentioned above, no background image change is permitted and the background image is invisible during the PiP playback. Thus, one of the background image buffers may be used for other purposes. For example, when the PiP function is enabled, one background image buffer is used to keep a background image, and the other background image buffer may be configured to buffer data of the secondary video.

When the video playback apparatus 100 is operated under one display mode, the first storage space 402 is configured to have a background image buffer 411 allocated therein for buffering one background image IMG_1 and the second storage space 404 is configured to have a background image buffer 412 allocated therein for buffering one background image IMG_2, as shown in the sub-diagram (A) of FIG. 4. For example, the background image buffer 412 serves as a working buffer for store decoded data currently generated from the still image decoding circuit 108. Therefore, the background image IMG_2 is generated after the complete background image IMG_1 is derived and stored in the background image buffer 411. When the video playback apparatus 100 is operated under another display mode, the first storage space 402 is configured to have the background image buffer 411 for keeping the latest background image IMG and the second storage space 404 is configured to have a plurality of buffers dedicated to buffering the secondary video related data, as shown in the sub-diagram (B) of FIG. 4. Regarding the decoding of a P-picture/B-picture of the secondary video which has an SD resolution, a maximum number of the reference pictures is five according to the BD specification. Therefore, in this exemplary embodiment, five reference buffers 413_1-413_5 may be allocated in the second storage space 404. In addition, one decoding buffer 414 for buffering the decoded data currently generated from the video decoder 112_2, three display buffers 415_1-415_3 for buffering fields to be read and processed by the display module 114_2, and a plurality of scale buffers (e.g., downscale buffers) 416_1-416_5 are also allocated in the second storage space 404. Thus, the second storage space 404 can be successfully shared between a first processing operation (e.g., a still image decoding operation) and a second processing operation (e.g., a video decoding operation) performed by the video playback apparatus 100.

The third exemplary storage space sharing scheme can be briefly summarized as follows. During a first time period in which the video playback apparatus 100 is operated under a first display mode, the still image decoding circuit 108 of the video decoding circuit 106 accesses the first storage space 402 for data associated with a first processing operation (e.g., a still image decoding operation), and the video decoder 112_2 of the video decoding circuit 106 accesses the second storage space 404 for data associated with a second processing operation (e.g., a video decoding operation). In addition, during a second time period in which the video playback apparatus 100 is operated under a second display mode different from the first display mode, the still image decoding circuit 108 of the video decoding circuit 106 accesses the first storage space 402 and the second storage space 404 for data associated with the first processing operation, wherein the second storage space 404 is dedicated to buffering data associated with the second processing operation during the first time period in which the video playback apparatus 100 is operated under the first display mode.

In the following, several exemplary output presentations and the pertinent allocation layouts of the storage device 104 are provided for better understanding of technical features of the present invention.

Figure 5:
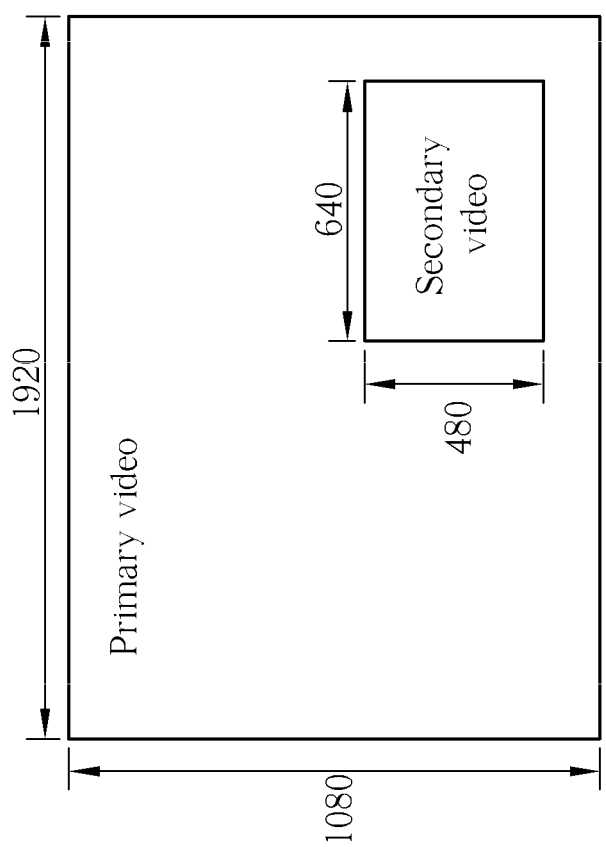
FIG. 5 is a diagram illustrating a first exemplary output presentation.
Figure 6:
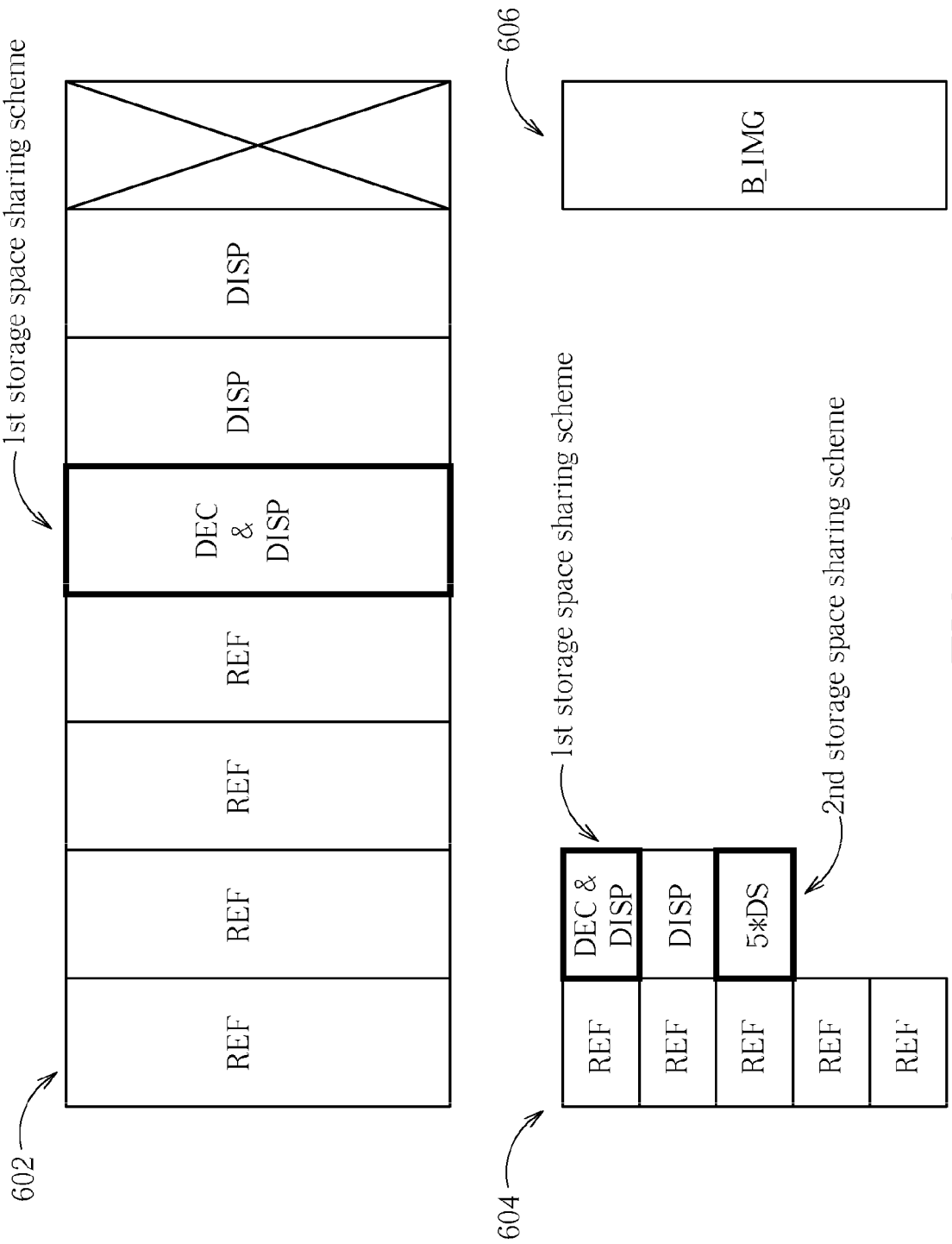
FIG. 6 is a diagram illustrating a first allocation layout of the storage device shown in FIG. 1.

Please refer to FIG. 5 in conjunction with FIG. 6. FIG. 5 is a diagram illustrating a first exemplary output presentation under a specific display mode, and FIG. 6 is a diagram illustrating a first allocation layout of the storage device 104 which corresponds to the exemplary output presentation shown in FIG. 5. Regarding the first exemplary output presentation shown in FIG. 5, the primary video is not downscaled and therefore has a resolution of 1920×1080, the secondary video is downscaled and therefore has a resolution of 640×480, and a background image is on the background and not displayed. The primary video frame buffer 602 is configured to have 7 allocated buffers, including 4 buffers acting as reference ("REF") buffers, one buffer acting as a decoding and display (DEC & DISP) buffer, and two buffers acting as display ("DISP") buffers. It should be noted that as the scaled primary video playback (e.g., downscaled primary video playback) is not enabled, the primary video frame buffer 602 does not need scale buffers (e.g., downscale buffers) included therein. Regarding the secondary video frame buffer 604, it has 12 allocated buffers, including 5 buffers acting as reference ("REF") buffers, one buffer acting as a decoding and display (DEC & DISP) buffer, one buffer acting as a display ("DISP") buffer, and 5 smaller buffers acting as downscale ("DS") buffers. As shown in FIG. 6, a size of one reference buffer included in the primary video frame buffer 602 is equal to a total size of 5 reference buffers included in the secondary video frame buffer 604, and a size of one reference buffer included in the secondary video frame buffer 604 is equal to a total size of 5 downscale buffers included in the secondary video frame buffer 604. Regarding the background image buffer 606, it has one allocated image ("B_IMG") buffer. Suppose that each buffer with a size equal to that of a reference buffer included in the primary video frame buffer 602 has a storage capacity of 3M bytes, and each buffer with a size equal to that of a reference buffer included in the secondary video frame buffer 604 has a storage capacity of 600K bytes. As the first storage space sharing scheme is applied to the primary video frame buffer 602, the implementation of the primary video frame buffer 602 requires a total storage capacity of 21M (7*3M) bytes. As the first storage space sharing scheme and the second storage space sharing scheme are both applied to the secondary video frame buffer 604, the implementation of the secondary video frame buffer 604 requires a total storage capacity of 4.8M (7*600K+5*120K (i.e., 1*600K)) bytes. In addition, the implementation of the background image buffer 606 simply requires a total storage capacity of 3M (1*3M) bytes.

Figure 7:
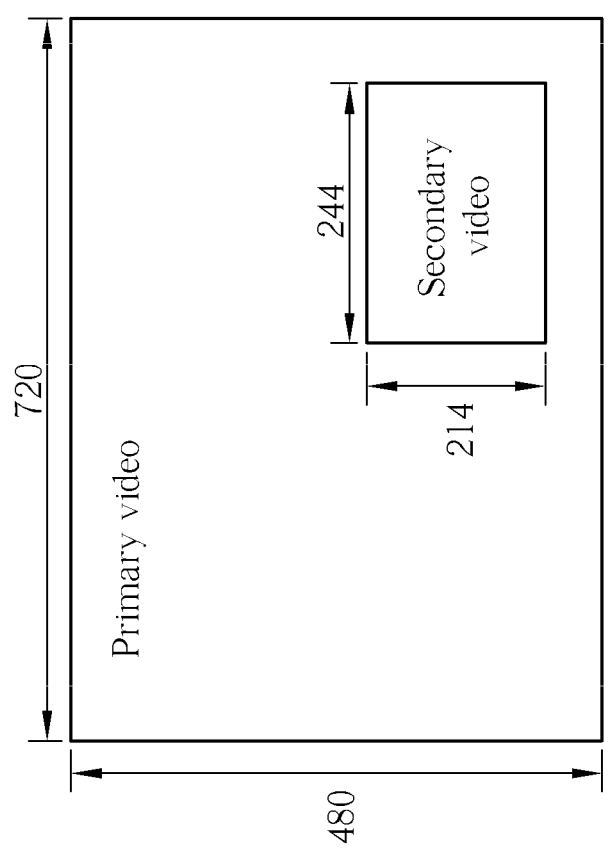
FIG. 7 is a diagram illustrating a second exemplary output presentation.
Figure 8:
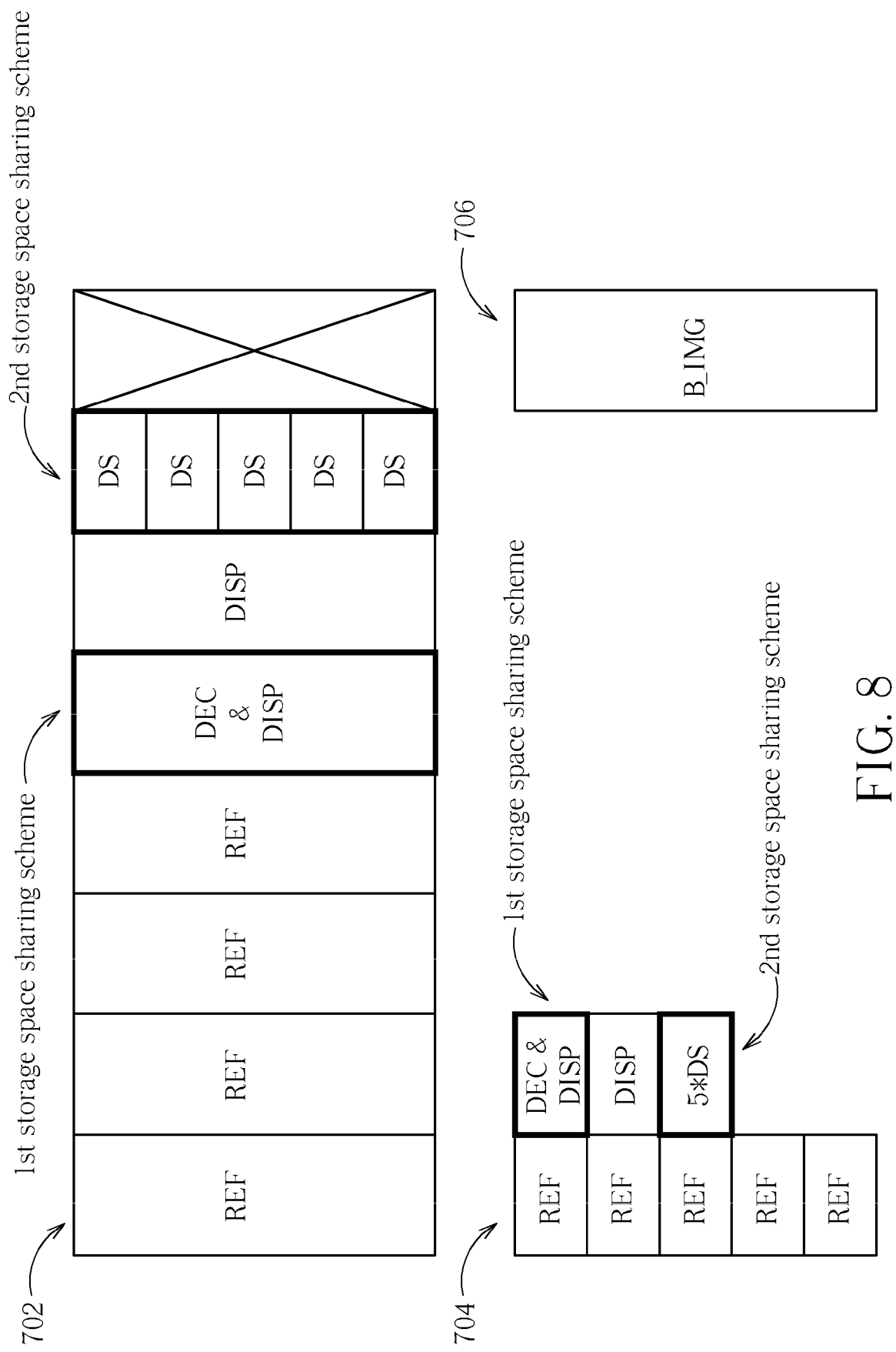
FIG. 8 is a diagram illustrating a second allocation layout of the storage device shown in FIG. 1.

Please refer to FIG. 7 in conjunction with FIG. 8. FIG. 7 is a diagram illustrating a second exemplary output presentation under a specific display mode, and FIG. 8 is a diagram illustrating a second allocation layout of the storage device 104 which corresponds to the exemplary output presentation shown in FIG. 7. Regarding the second exemplary output presentation shown in FIG. 7, the primary video is downscaled and has a resolution of 720×480, the secondary video is downscaled and has a resolution of 244×214, and a background image is on the background and not displayed. The primary video frame buffer 702 has 7 allocated buffers, including 4 buffers acting as reference ("REF") buffers, one buffer acting as a decoding and display (DEC & DISP) buffer, one buffer acting as a display ("DISP") buffer, and five smaller buffers acting as downscale ("DS") buffers. It should be noted that as the scaled primary video playback (e.g., downscaled primary video playback) is enabled, the primary video frame buffer 702 therefore needs scale buffers (e.g., downscale buffers) included therein. Regarding the secondary video frame buffer 704, it has 12 allocated buffers, including 5 buffers acting as reference ("REF") buffers, one buffer acting as a decoding and display (DEC & DISP) buffer, one buffer acting as a display ("DISP") buffer, and 5 smaller buffers acting as downscale ("DS") buffers. As shown in FIG. 8, a size of one reference buffer included in the primary video frame buffer 702 is equal to a total size of 5 reference buffers included in the secondary video frame buffer 704, a size of one reference buffer included in the secondary video frame buffer 704 is equal to a total size of 5 downscale buffers included in the secondary video frame buffer 704, and a size of one reference buffer included in the primary video frame buffer 702 is equal to a total size of 5 downscale buffers included in the primary video frame buffer 702. Regarding the background image buffer 706, it has one allocated image ("B_IMG") buffer. Suppose that each buffer with a size equal to that of a reference buffer included in the primary video frame buffer 702 has a storage capacity of 3 M bytes, and each buffer with a size equal to that of a reference buffer included in the secondary video frame buffer 704 has a storage capacity of 600K bytes. As the first storage space sharing scheme and the second storage space sharing scheme are both applied to the primary video frame buffer 702, the implementation of the primary video frame buffer 702 therefore requires a total storage capacity of 21M (6*3M+5*600K (i.e., 1*3M)) bytes. As the first storage space sharing scheme and the second storage space sharing scheme are both applied to the secondary video frame buffer 704, the implementation of the secondary video frame buffer 704 therefore requires a total storage capacity of 4.8M (7*600K+5*120K) bytes. In addition, the implementation of the background image buffer 706 simply requires a total storage capacity of 3M (1*3M) bytes.

Figure 9:
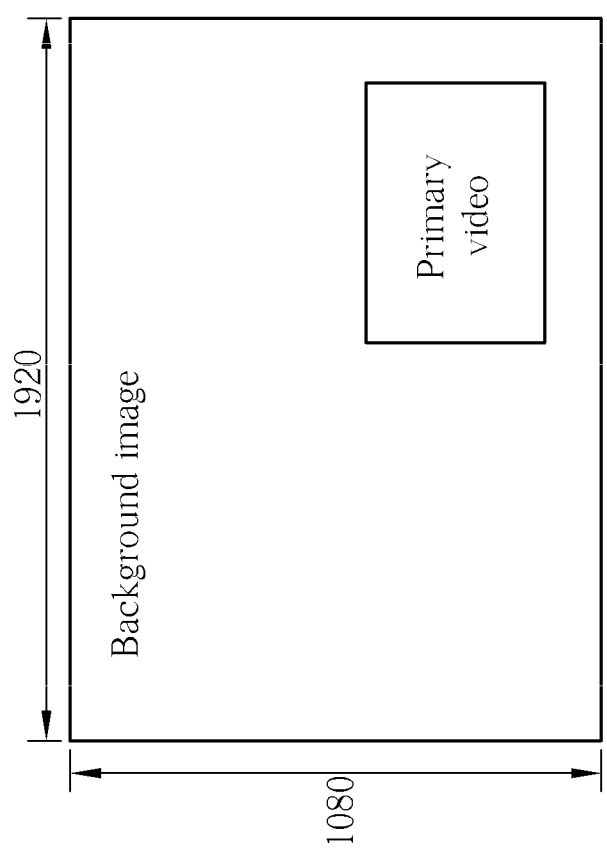
FIG. 9 is a diagram illustrating a third exemplary output presentation.
Figure 10:
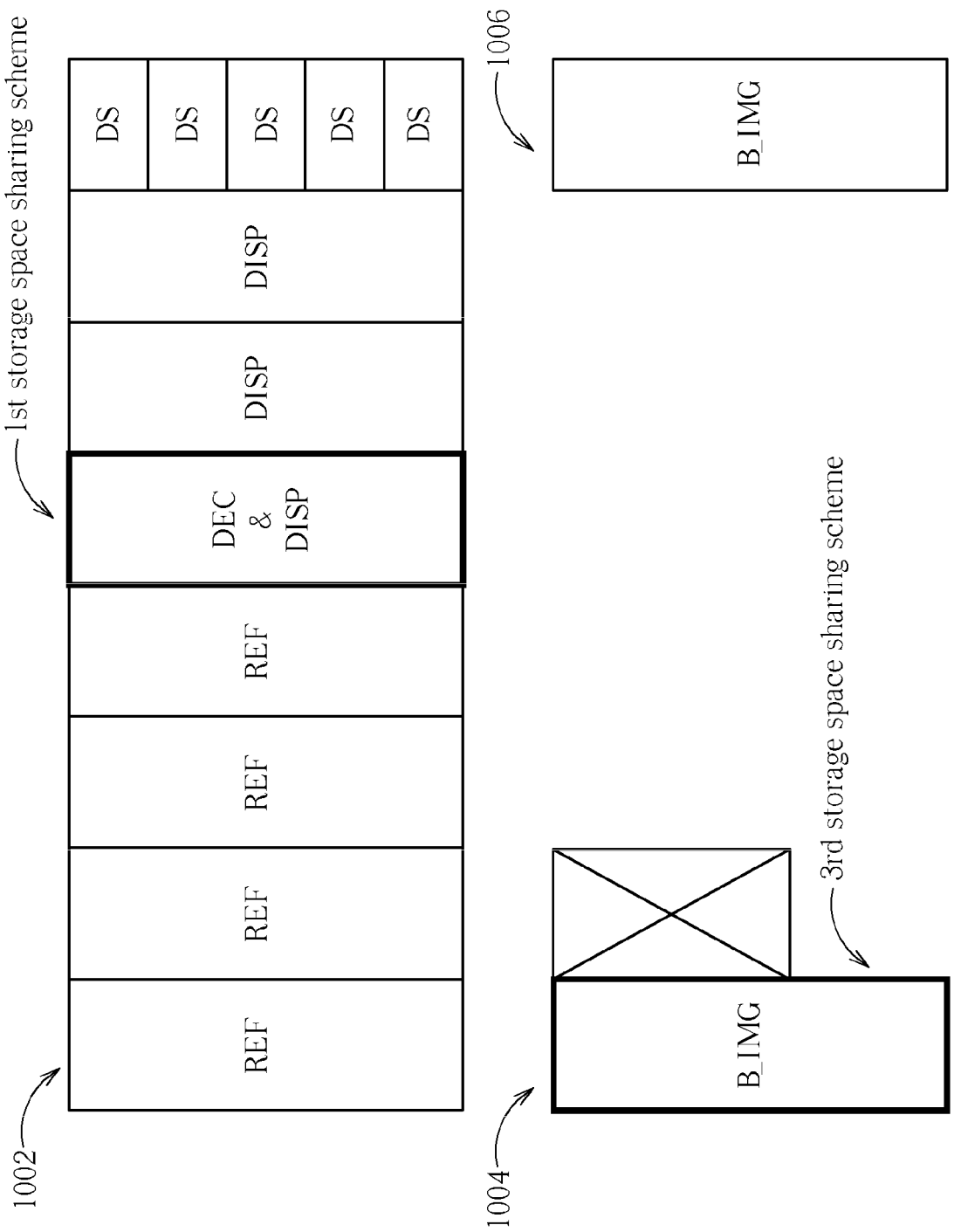
FIG. 10 is a diagram illustrating a third allocation layout of the storage device shown in FIG. 1.

Please refer to FIG. 9 in conjunction with FIG. 10. FIG. 9 is a diagram illustrating a third exemplary output presentation under a specific display mode, and FIG. 10 is a diagram illustrating a third allocation layout of the storage device 104 which corresponds to the exemplary output presentation shown in FIG. 9. Regarding the third exemplary output presentation shown in FIG. 9, the primary video is downscaled and has a resolution lower than 1920×1080, no secondary video is displayed, and a background image is on the foreground and displayed. The primary video frame buffer 1002 has 12 allocated buffers, including 4 buffers acting as reference ("REF") buffers, one buffer acting as a decoding and display (DEC & DISP) buffer, two buffers acting as display ("DISP") buffers, and five smaller buffers acting as downscale ("DS") buffers. It should be noted that as scaled primary video playback (e.g., downscaled primary video playback) is enabled, the primary video frame buffer 1002 therefore needs scale buffers (e.g., downscale buffers) included therein. As shown in FIG. 10, a size of one reference buffer included in the primary video frame buffer 1002 is equal to a total size of 5 downscale buffers included in the primary video frame buffer 1002. As no secondary video playback is needed, the secondary video frame buffer 1004 can be configured to have one allocated buffer which acts as an image ("B_IMG") buffer such as a working buffer for a background image. Regarding the background image buffer 1006, it has one allocated image ("B_IMG") buffer. Suppose that each buffer with a size equal to that of a reference buffer included in the primary video frame buffer 1002 has a storage capacity of 3M bytes. As the first storage space sharing scheme is applied to the primary video frame buffer 1002, the implementation of the primary video frame buffer 1002 therefore requires a total storage capacity of 24M (7*3M+5*600K (i.e., 1*3M)) bytes. As the third storage space sharing scheme is applied to the secondary video frame buffer 1004, the implementation of the secondary video frame buffer 1004 therefore requires a total storage capacity of 3M (1*3M) bytes. In addition, the implementation of the background image buffer 1006 simply requires a total storage capacity of 3M (1*3M) bytes.

Figure 11:
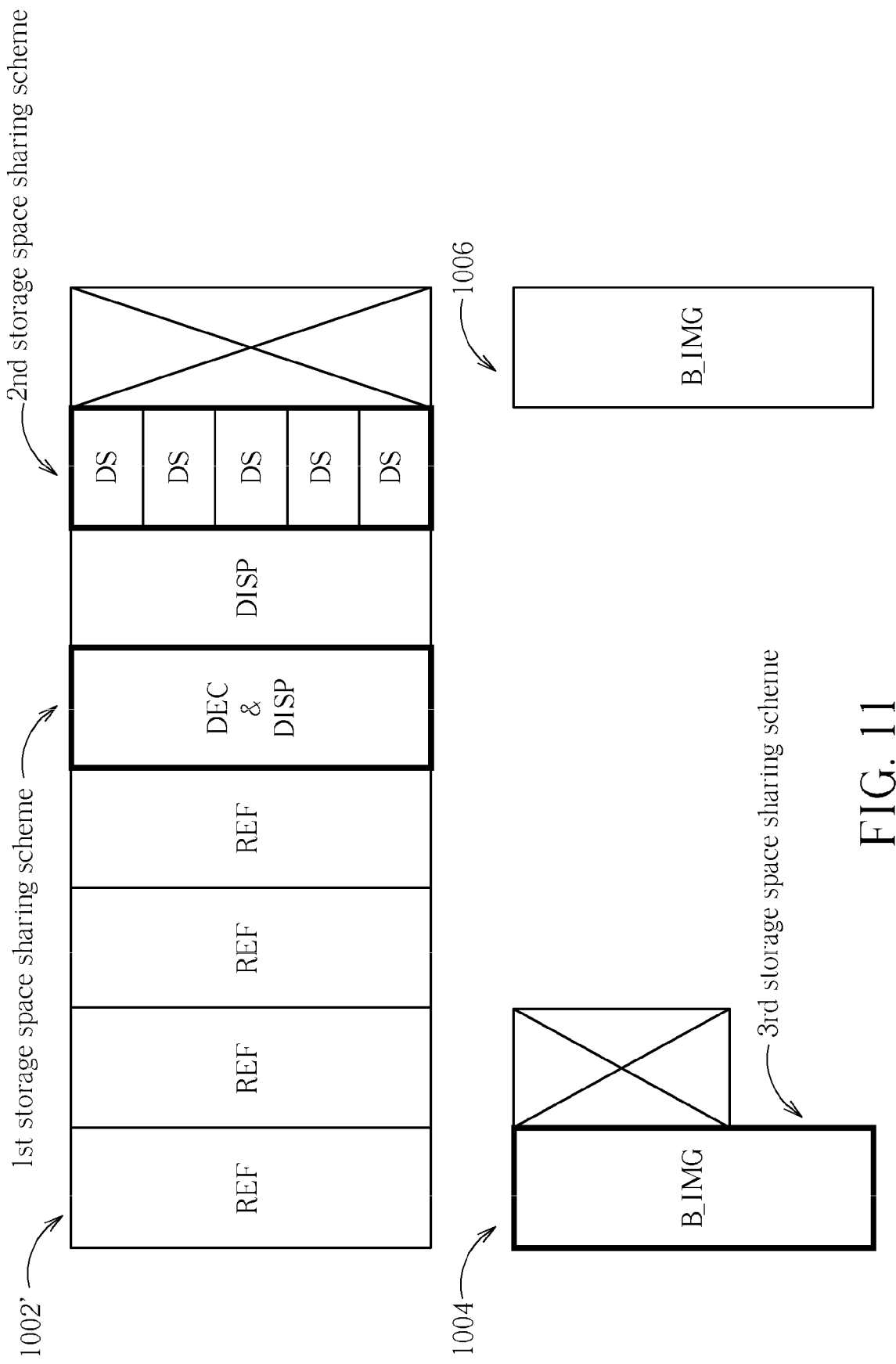
FIG. 11 is a diagram illustrating an alternative design of the storage device allocation layout shown in FIG. 10.

Regarding the primary video frame buffer 1002 shown in FIG. 10, only the first storage space sharing scheme is applied thereto. However, in an alternative design of the primary video frame buffer 1002 as shown in FIG. 11, the first storage space sharing scheme and the second storage space sharing scheme are both applied to the primary video frame buffer 1002'. Thus, the implementation of the primary video frame buffer 1002' requires a total storage capacity of 21M (6*3M+ 5*600K (i.e., 1*3M)) bytes. Compared to the implementation of the primary video frame buffer 1002 shown in FIG. 10, the implementation of the primary video frame buffer 1002' occupies a smaller storage area.

To meet all buffer requirements of these exemplary output presentations mentioned above, a minimum required storage capacity of the storage device 104 is 31.8M (24M+4.8M+ 3M). Thus, with the help of the proposed storage space sharing schemes, the storage device 104 with a smaller storage capacity can be realized, leading to a reduced production cost of the video playback apparatus 100.

It should be noted that the exemplary allocation layouts of the storage device 104 shown in FIG. 6, FIG. 8, FIG. 10, and FIG. 11 are for illustrative purposes only, and are not meant to be limitations to the scope of the present invention. That is, any storage device allocation layout employing at least one of the aforementioned exemplary storage space sharing schemes shown in FIG. 2, FIG. 3, and FIG. 4 obeys the spirit of the present invention and falls with the scope of the present invention.

Moreover, in above exemplary embodiments, the primary video stream V_PRI, the secondary video stream V_SEC, and the background image data IMG_BG are all derived from a BD disc and thus comply with the BD specification. However, this by no means implies that the exemplary storage space sharing schemes can be applied to the playback of BD video contents only. That is, an exemplary storage space sharing scheme proposed in the present invention can be employed to reduce the buffer requirement as long as the condition/criterion of performing the exemplary storage space sharing scheme is satisfied. In this way, the display quality is not degraded even though the storage space sharing scheme is employed.

Those skilled in the art will readily observe that numerous modifications and alterations of the device and method may be made while retaining the teachings of the invention.

What is claimed is:

1. A method for managing a first storage space and a second storage space utilized by a video playback operation, comprising:
    during a first time period, accessing the first storage space for data associated with a first processing operation included in the video playback operation, and accessing the second storage space for data associated with a second processing operation included in the video playback operation, wherein the first processing operation is different from the second processing operation, and the second storage space is dedicated during the first time period to buffering data associated with the second processing operation; and
    during a second time period different from the first time period, accessing the first storage space and the second storage space for data associated with the first processing operation of the video playback operation;
    wherein the second storage space is different from the first storage space; and the second storage space is not accessed by the first processing operation of the video playback operation during the first time period, and is accessed by the first processing operation during the second time period.

2. The method of claim 1, wherein during the first time period, the video playback operation is operated under a first phase of a display mode; during the second time period, the video playback operation is operated under a second phase of the display mode; the first processing operation is a video output operation; and the second processing operation is a video decoding operation.

3. The method of claim 2, wherein the video decoding operation generates a plurality of fields, and the video output operation performs de-interlacing upon the fields and accordingly generates at least one frame.

4. The method of claim 3, wherein the second storage space includes a first buffer area and a second buffer area; when the video playback operation is operated under the first phase of the display mode, the video decoding operation generates a portion of a first picture and a portion of a second picture to the first buffer area and the second buffer area, respectively, and the video output operation reads data from the first storage space, wherein one of the first picture and the second picture is a top field and the other of the first picture and the second picture is a bottom field; and when the video playback operation is operated under the second phase of the display mode, the video decoding operation generates a remaining portion of the first picture and a remaining portion of the second picture to the first buffer area and the second buffer area, respectively, and the video output operation reads data from the first storage space and sequentially reads the portion and the remaining portion of the first picture from the first buffer area.

5. The method of claim 2, wherein the video output operation is a non-scaled video output operation which processes non-scaled pictures.

6. The method of claim 2, wherein the video decoding operation decodes a primary video stream complying with a Blu-ray disc (BD) specification.

7. The method of claim 2, wherein the video decoding operation decodes a secondary video stream complying with a Blu-ray disc (BD) specification.

8. The method of claim 1, wherein during the first time period, the video playback operation is operated under a first display mode; during the second time period, the video playback operation is operated under a second display mode different from the first display mode; the first processing operation is a non-scaled video decoding operation which generates non-scaled pictures; and the second processing operation is a scaled video decoding operation which generates scaled pictures.

9. The method of claim 8, wherein when the video playback operation is operated under the second display mode, the first storage space is configured to have a plurality of display buffers allocated therein and the second storage space is configured to have a display buffer allocated therein; when the video playback operation is operated under the first display mode, the first storage space is configured to have the display buffers allocated therein and the second storage space is configured to have a plurality of scale buffers allocated therein; each allocated display buffer is for buffering non-scaled picture data; and each allocated scale buffer is for buffering scaled picture data.

10. The method of claim 8, wherein the non-scaled pictures and the scaled pictures are derived from a primary video stream complying with a Blu-ray disc (BD) specification.

11. The method of claim 8, wherein the non-scaled pictures and the scaled pictures are derived from a secondary video stream complying with a Blu-ray disc (BD) specification.

12. The method of claim 1, wherein during the first time period, the video playback operation is operated under a first display mode; during the second time period, the video playback operation is operated under a second display mode different from the first display mode; the first processing operation is a still image decoding operation; and the second processing operation is a video decoding operation.

13. The method of claim 12, wherein when the video playback operation is operated under the first display mode, a still image generated by the still image decoding operation is kept in the first storage space during the first time period, and the video decoding operation generates pictures to the second storage space; and when the video playback operation is operated under the second display mode, the still image decoding operation generates a first image to the first storage space, and generates a second background image to the second storage space.

14. The method of claim 12, wherein the video decoding operation decodes a secondary video stream complying with a Blu-ray disc (BD) specification, and the still image decoding operation decodes background image data complying with the BD specification.

15. A video playback apparatus, comprising:
a storage device, having a first storage space and a second storage space allocated therein; and
a video playback processing device, coupled to the storage device, wherein during a first time period, the video playback processing device accesses the first storage space for data associated with a first processing operation performed by the video playback processing device, and accesses the second storage space for data associated with a second processing operation performed by the video playback processing device, where the first processing operation is different from the second processing operation, and the second storage space is dedicated during the first time period to buffering data associated with the second processing operation; and during a second time period different from the first time period, the video playback processing device accesses the first storage space and the second storage space for data associated with the first processing operation of the video playback operation performed by the video playback processing device;
wherein the second storage space is different from the first storage space; and the second storage space is not accessed by the first processing operation performed by the video playback processing device during the first time period, and is accessed by the first processing operation of the video playback operation performed by the video playback processing device during the second time period.

16. The video playback apparatus of claim 15, wherein during the first time period, the video playback apparatus is operated under a first phase of a display mode; during the second time period, the video playback apparatus is operated under a second phase of the display mode; and the video playback processing device comprises:
a video output circuit, arranged to perform the first processing operation; and
a video decoding circuit, arranged to perform the second processing operation.

17. The video playback apparatus of claim 16, wherein the video decoding circuit generates a plurality of fields, and the video output circuit performs de-interlacing upon the fields and accordingly generates at least one frame.

18. The video playback apparatus of claim 17, wherein the second storage space includes a first buffer area and a second buffer area; when the video playback apparatus is operated under the first phase of the display mode, the video decoding circuit generates a portion of a first picture and a portion of a second picture to the first buffer area and the second buffer area, respectively, and the video output circuit reads data from the first storage space, where one of the first picture and the second picture is a top field and the other of the first picture and the second picture is a bottom field; and when the video playback apparatus is operated under the second phase of the display mode, the video decoding circuit generates a remaining portion of the first picture and a remaining portion of the second picture to the first buffer area and the second buffer area, respectively, and the video output circuit reads data from the first storage space and sequentially reads the portion and the remaining portion of the first picture from the first buffer area.

19. The video playback apparatus of claim 16, wherein the first processing operation performed by the video output circuit is a non-scaled video output operation which processes non-scaled pictures.

20. The video playback apparatus of claim 16, wherein the video decoding circuit decodes a primary video stream complying with a Blu-ray disc (BD) specification.

21. The video playback apparatus of claim 16, wherein the video decoding circuit decodes a secondary video stream complying with a Blu-ray disc (BD) specification.

22. The video playback apparatus of claim 15, wherein during the first time period, the video playback apparatus is operated under a first display mode; during the second time period, the video playback apparatus is operated under a second display mode different from the first display mode; and the video playback processing device comprises:
a video decoding circuit, arranged to perform the first processing operation and the second processing operation, wherein the first processing operation is a non-scaled video decoding operation which generates non-scaled pictures, and the second processing operation is a scaled video decoding operation which generates scaled pictures.

23. The video playback apparatus of claim 22, wherein when the video playback apparatus is operated under the second display mode, the first storage space of the storage device is configured to have a plurality of display buffers allocated therein and the second storage space of the storage device is configured to have a display buffer allocated therein; when the video playback apparatus is operated under the first display mode, the first storage space of the storage device is configured to have the display buffers allocated therein and the second storage space of the storage device is configured to have a plurality of scale buffers allocated therein; each allocated display buffer is for buffering non-scaled picture data; and each allocated scale buffer is for buffering scaled picture data.

24. The video playback apparatus of claim 22, wherein the non-scaled pictures and the scaled pictures are derived from a primary video stream complying with a Blu-ray disc (BD) specification.

25. The video playback apparatus of claim 22, wherein the non-scaled pictures and the scaled pictures are derived from a secondary video stream complying with a Blu-ray disc (BD) specification.

26. The video playback apparatus of claim 15, wherein during the first time period, the video playback apparatus is operated under a first display mode; during the second time period, the video playback apparatus is operated under a second display mode different from the first display mode; and the video playback processing device comprises:
a still image decoding circuit, arranged to perform the first processing operation; and a video decoding circuit, arranged to perform the second processing operation.

27. The video playback apparatus of claim 26, wherein when the video playback apparatus is operated under the first display mode, a still image generated by the still image decoding circuit is kept in the first storage space during the first time period, and the video decoding circuit generates pictures to the second storage space; and when the video playback apparatus is operated under the second display mode, the still image decoding circuit generates a first image to the first storage space, and generates a second background image to the second storage space.

28. The video playback apparatus of claim 26, wherein the video decoding circuit decodes a secondary video stream complying with a Blu-ray disc (BD) specification, and the still image decoding circuit decodes background image data complying with the BD specification.

* * * * *